United States Patent

Ponziani et al.

[11] Patent Number: 5,979,796
[45] Date of Patent: Nov. 9, 1999

[54] HEATED WINDSHIELD WIPER WASHER NOZZLE SYSTEM AND METHOD

[75] Inventors: Richard L. Ponziani, Centerville; Mark M. Benner, Springboro, both of Ohio

[73] Assignee: Valeo, Inc., Auburn Hills, Mich.

[21] Appl. No.: 08/768,997

[22] Filed: Dec. 18, 1996

[51] Int. Cl.⁶ .................................................. B05B 1/100
[52] U.S. Cl. ...................... 239/284.1; 239/132; 239/133; 222/146.2; 222/146.5; 392/478; 219/202; 219/203
[58] Field of Search .............................. 239/284.1, 132, 239/133, 135; 222/146.2, 146.5; 219/202, 203; 392/484, 494, 478; 15/250.05

[56] References Cited

U.S. PATENT DOCUMENTS

| | | | |
|---|---|---|---|
| 3,418,676 | 12/1968 | Byczkowski et al. | 15/250.04 |
| 3,716,886 | 2/1973 | Klomp | 15/250.04 |
| 3,936,901 | 2/1976 | Theckston | 15/250.04 |
| 4,212,425 | 7/1980 | Schlick | 239/133 |
| 4,360,941 | 11/1982 | Mabie | 15/250.06 |
| 4,387,290 | 6/1983 | Yasunda | 219/202 |
| 4,497,083 | 2/1985 | Nielsen, Jr. et al | 15/250.06 |
| 4,603,451 | 8/1986 | VanSickle | 15/250.07 |
| 4,670,933 | 6/1987 | Topleszky | 15/250.07 |
| 4,928,345 | 5/1990 | Meltzer et al. | 15/250.06 |
| 4,967,437 | 11/1990 | Morse | 15/250.07 |
| 5,046,216 | 9/1991 | Baungarter et al. | 15/250.29 |
| 5,057,754 | 10/1991 | Bell | 318/483 |
| 5,065,471 | 11/1991 | Laplante | 15/250.04 |
| 5,097,563 | 3/1992 | Cowan | 15/313 |
| 5,221,828 | 6/1993 | Basheer et al. | 219/202 |
| 5,325,561 | 7/1994 | Kotlar | 15/250.06 |
| 5,327,614 | 7/1994 | Egner-Walter et al. | 15/250.04 |

(List continued on next page.)

FOREIGN PATENT DOCUMENTS

| | | |
|---|---|---|
| 0353643 | 1/1990 | European Pat. Off. . |
| 0724992 | 8/1996 | European Pat. Off. . |
| 8805616 | 7/1988 | Germany . |
| 19503068 | 8/1996 | Germany . |
| 2239823 | 7/1991 | United Kingdom .............. B05B 1/24 |
| 2250218 | 6/1992 | United Kingdom .............. B05B 1/10 |

OTHER PUBLICATIONS

"EMI–X, EMI Attenuating Composites", Bulletin248–1194, LNP Engineering Plastic, Inc., 475 Creamery Way, Exton, PA 19341, 1994.

"Electram, Electrically Conductive Materials", DSM Engineering Plastics, 2267 West Mill Road, Evansville, IN 47732–333, 1993.

"STAT–KON, A Guide to LNP's Line of Thermoplastic Composites for Electrostatic Dissipation", LNP Engineering Plastics, Inc., 475 Creamery Way, Exton, PA 19341, 1994.

International Search Report dated Mar. 31, 1998.

*Primary Examiner*—Andres Kashnikow
*Assistant Examiner*—David Deal
*Attorney, Agent, or Firm*—J. Gordon Lewis

[57] ABSTRACT

A system and method for maintaining a washer fluid above a predetermined temperature at a point of delivery where the fluid is directed onto a windshield of a vehicle. The system and method include a washer nozzle that has an internal resistance such that, when a current is passed through the nozzle, a temperature of nozzle is maintained at a predetermined temperature which is above the freezing temperature of the fluid. In one embodiment, the nozzle body and its electrical terminals are a one-piece molded construction, with another embodiment having a plurality of metallic conductors insert-molded into the nozzle. The nozzle has a nozzle body which is molded of an electrically conductive, internally-resistive, thermo-plastic which can be energized with less than about twenty or even ten amperes so that the nozzle body temperature is maintained above, for example, one hundred twenty degrees Fahrenheit when an ambient temperature of about seventy-five degrees Fahrenheit. In one embodiment, the nozzle body in the embodiment being described has a volume resistance of less than $10^{11}$ ohms-cm and a internal resistance of less than about 500 ohms.

7 Claims, 1 Drawing Sheet

U.S. PATENT DOCUMENTS

| | | | |
|---|---|---|---|
| 5,419,005 | 5/1995 | Mori | 15/313 |
| 5,426,814 | 6/1995 | Minnick | 15/250.04 |
| 5,454,134 | 10/1995 | Edele et al. | 15/250.04 |
| 5,462,707 | 10/1995 | Nagy | 264/146 |
| 5,488,752 | 2/1996 | Randolph | 15/250.06 |
| 5,504,965 | 4/1996 | Guell | 15/250.06 |
| 5,539,951 | 7/1996 | Guell et al. | 15/250.04 |
| 5,558,792 | 9/1996 | Gauharou | 219/202 |
| 5,713,864 | 2/1998 | Verkaart | 604/113 |

HEATED WINDSHIELD WIPER WASHER NOZZLE SYSTEM AND METHOD

BACKGROUND OF THE INVENTION

1. Field of the Invention

This invention relates to windshield wiping systems, and more particularly, to a system and method for maintaining a windshield wash fluid in a liquid state using an internally-resistive and electrically conductive washer nozzle which is provided in a one-piece molded construction.

2. Description of Related Art

Windshield wiper systems have for many years included systems and methods for directing wiper fluid to a surface of a windshield while the wiper blades are actuated in order to wash and clean the windshield from debris, such as dirt, snow, rain and the like. In winter conditions, the washer fluid may have a tendency to freeze, particularly if an alcohol or antifreeze used in the washer fluid is evaporated sufficiently to increase the freezing temperature of the fluid above the ambient temperature in any part of the wiper system. This evaporation occurs mostly at the output or washer nozzles which directs the fluid in a spray pattern onto the surface of the windshield.

Heated nozzles have been used in the past that have a built-in heating device, such as a coil or other metallic heater, either molded into the nozzle directly or otherwise inserted into the nozzle.

In some prior applications of the heated concept, wiper blades have been provided with conduits for directing washer fluid to the windshield wherein the wiper blades comprise a heating element, such as a coil, mounted or molded directly into the wiper blade.

In U.S. Pat. No. 5,221,828 issued to Basheer et al., a thermally conductive elastomeric or rubber material is shown having a plurality of terminals which, when energized, apparently cause the wiper blade to become heated. Unfortunately, the amperage needed to heat a wiper blade of this design is estimated to be unreasonably large, such as in excess of 50 amps. This reduces or eliminates the attractiveness of the design of this approach. Also, it is believed that the engineering, tooling and surrounding apparatus, such as the wires used to couple the wiper blade to the electrical system of a vehicle makes this approach an unattractive design and relatively expensive.

What is needed, therefore, is a simple design, which is relatively easy to implement, inexpensive to manufacture and which provides a simple system and method for maintaining a washer fluid in a liquid state so the fluid may be sprayed on the windshield.

SUMMARY OF THE INVENTION

It is, therefore, a primary object of the invention to provide a windshield wiper nozzle which is simple in design, wherein the nozzle body is an internally resistive, electrically conductive thermoplastic which is a one-piece molded construction.

Another object of the invention is to provide a nozzle having terminals which are integrally molded in a one-piece construction, wherein the nozzle may be energized with a low amount of current, such as less than 20 or even 10 amperes, in order to maintain the nozzle at a predetermined temperature which is above the freezing temperature of a washer fluid.

Still another object of the invention is to provide a nozzle having an internal resistance of less than about five hundred ohms and which is capable of maintaining a nozzle body or a portion thereof heated such that washer fluid in maintained in a liquid state at a low amperage such as less than 20 or even 10 amperes.

In one aspect, this invention comprises a windshield wiper nozzle comprising a nozzle body, the nozzle body being thermally responsive to an electrical charge to heat the body to a predetermined temperature.

In another aspect, this invention comprises a windshield wiping system for use on a vehicle, the windshield wiping system comprising at least one wiper blade for wiping a window on the vehicle, a wiper drive for driving at least one wiper blade to wipe a window of said vehicle, a washer pump for pumping washer fluid from a reservoir to a window, a windshield wiper nozzle coupled to the washer pump for directing the washer fluid to the window and a wiper switch for energizing either the washer pump or the wiper drive, the windshield wiper nozzle being molded of a thermo-electrical material which, when energized, maintains the temperature of the fluid above a predetermined temperature.

In still another aspect, this invention comprises a method for maintaining a washer fluid at a predetermined temperature, the method comprising the steps of situating a windshield wiper nozzle on a vehicle in proximity to a window, actuating at least one window wiper to wipe the window, energizing a washer pump to direct a washer fluid through the windshield wiper nozzle onto the window during the actuating step and energizing the windshield wiper nozzle heating the washer fluid to at least a predetermined temperature, the windshield wiper nozzle is molded of a thermo-electrical material which, when energized, maintains the temperature of the fluid above a predetermined temperature.

In yet another aspect, this invention comprises a windshield wiping system for use on a vehicle, the windshield wiping system comprising at least one wiper blade for wiping a window on the vehicle, a wiper drive for driving at least one wiper blade to wipe a window of the vehicle, a washer pump for pumping washer fluid from a reservoir to a window, windshield wiper nozzle means coupled to the washer pump for directing the washer fluid to the window and a wiper switch for energizing either the washer pump or the wiper drive, the windshield wiper nozzle means being molded of a thermo-electrical material which, when energized, maintains the temperature of the fluid above a predetermined temperature.

Other objects and advantages of the invention will be apparent from the following description, the accompanying drawings, and the appended claims.

DETAILED DESCRIPTION OF THE PREFERRED EMBODIMENTS

Figure 1:
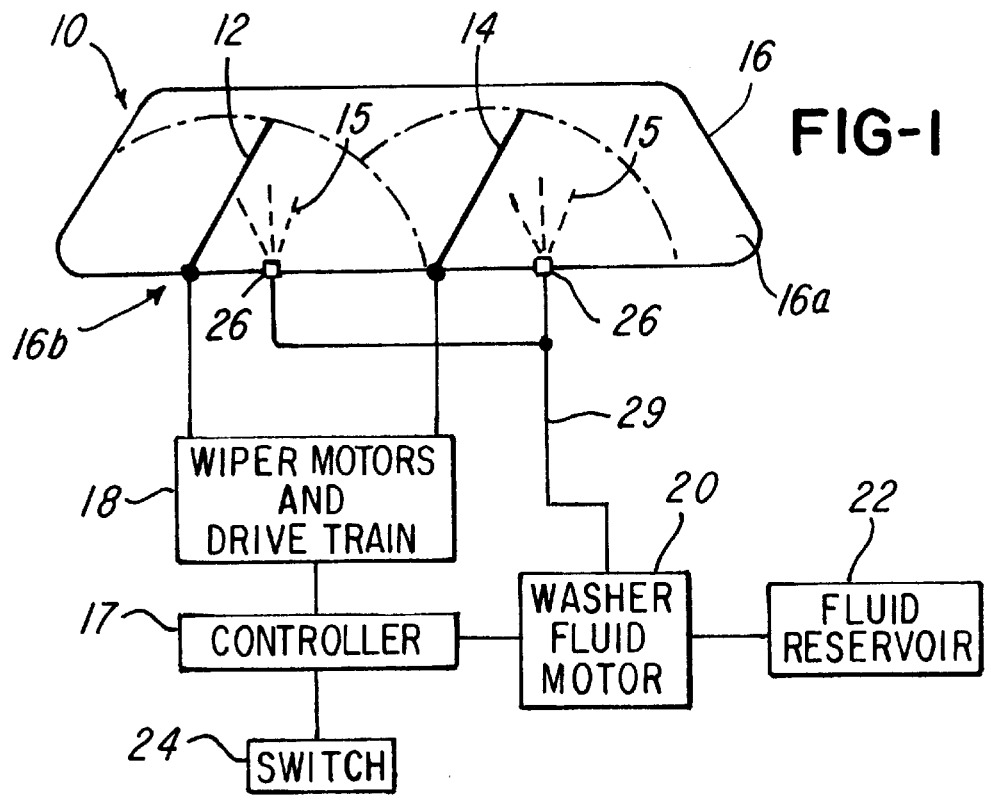
FIG. 1 is a schematic view of a windshield wiping system incorporating features of the present invention.

Referring now to FIG. 1, a windshield wiper system 10 for use on a vehicle (not shown) is shown comprising features of the present invention. The windshield wiper system 10 comprises at least one wiper blade, such as blades 12 and 14, for wiping a surface 16a of a window or windshield 16 on the vehicle.

The windshield wiper system 10 further comprises a controller 17 coupled to a wiper drive, drive means or driver 18 for driving the wiper blades 12 and 14 in order to wipe the windshield 16 free of debris, such as water, dirt, leaves, snow and the like.

The windshield wiper system 10 further comprises a windshield wiper washer fluid motor or pump 20 for pumping washer fluid 15 from a reservoir 22 to the windshield 16. As mentioned earlier herein, it is preferable to maintain the windshield wiper washer fluid 15 in a liquid state so that it can perform on demand when a driver (not shown) of the vehicle actuates a wiper or wash switch to initiate a wash cycle, such as wiper switch 24, in order to cause controller 17 to energize the washer pump 20 and wiper drive 18.

The windshield wiper system 10 further comprises a plurality of windshield wiper nozzles 26 which are coupled to the washer pump 20 via suitable elastomeric or rubber tubing (shown as line 29). The function of the wiper nozzle 26 is to direct the washer fluid 15 towards the windshield 16 in a predetermined spray pattern (not shown). Another function of the wiper nozzle 26 in the embodiment being described is to maintain the fluid in a liquid state, particularly in extremely cold conditions so that the fluid can be directed towards the window 16 on demand by an operator of the vehicle.

Figure 2:
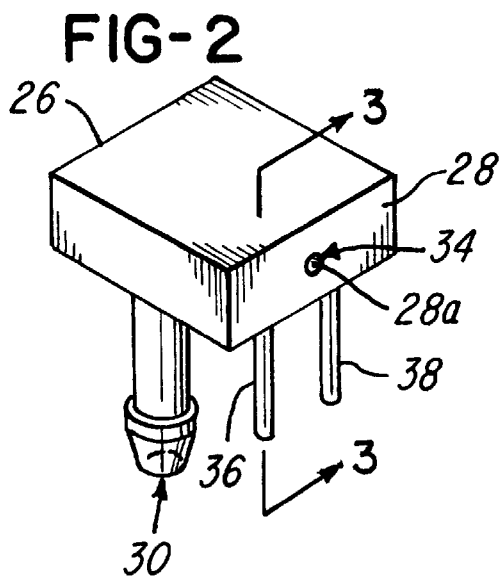
FIG. 2 is a fragmentary view of a windshield wiper nozzle shown in FIG. 1.

As best illustrated in FIG. 2, the wiper nozzle 26 comprises a nozzle body 28 having a nozzle inlet 30 which is in fluid communication with a nozzle outlet 34 via a passageway 28a. The nozzle body 28 is molded in a one-piece construction to define the passageway 28a between the inlet 30 and outlet 34 such that when wiper pump 20 is energized, fluid may be directed into inlet 30 and, ultimately, out of outlet 34 onto surface 16a of windshield 16.

In the embodiment being described, the nozzle body 28 is molded from an electrically conductive thermoplastic material having a volume resistivity defined by the following equation 1:

$$P = R \times (A/T) = \text{ohm-cm} \qquad (\text{EQ. 1})$$

where:

P = volume resistance;
A = Area (cm$^2$) of an electrode used to measure resistance R;
T = Thickness (cm) of nozzle body; and
R = resistance (ohms)

In this regard, the internally-resistive, electrically conductive thermal-plastic material preferably comprises a volume resistance of less than about $10^{11}$ ohms-cm.

Notice that the nozzle body 28 comprises a plurality of electrically conductive terminals, such as terminals 36 and 38 which are integrally molded as part of the nozzle body 28. Alternatively, as illustrated in FIG. 4, the nozzle body 28 may have a plurality of metallic terminals or wires, such as wires 40 and 42, integrally molded or insert-molded directly into the nozzle body 28.

In the embodiment being described, the nozzle body 28 is thermally responsive to an electrical charge to heat the body to a predetermined temperature. In this regard, it has been found that when a voltage of about 13.5 volts is applied across terminals 36 and 38, a resultant current is generated of 0.027 amps (13.5 volts ÷500 ohms) or less than about 10 or even 1.0 amperes, which has been found to be suitable for heating the nozzle body to over one hundred (100°) or even one hundred and twenty degrees (120°) Fahrenheit when the ambient temperature is about seventy five degrees (75°) Fahrenheit.

Moreover, it has been found that a nozzle body 28 molded from a thermally and electrically conductive thermo-plastic having a resistance of less than about five hundred (500) ohms has been found to be satisfactory to maintain the washer fluid 15 resident in the passageway 28a and at outlet 34 in the liquid state in order to prevent, for example, freezing. In a preferred embodiment of the invention, the nozzle body 28 may be molded from a electrically conductive plastic material. Such electronically conductive plastic material may include the Stat-Kon® plastic materials which are described in Bulletins 248–1194 and 223–894 available from LNP Engineering Plastic at 475 Creamery Way, Exton, Pa. 19341 or the plastic materials or electrically conductive compounds described in the Electram electrically conductive materials brochure available from DSM Engineering Plastics at 2267 West Mill Road, Evandale, Ind. 47732-333.

Figure 4:
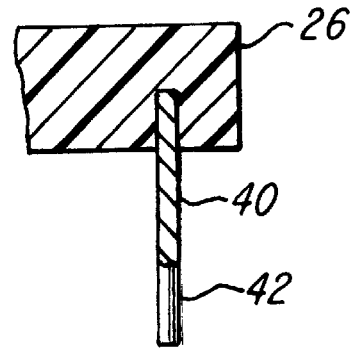
FIG. 4 is a view similar to FIG. 3 showing a nozzle body with insert-molded terminals.
Figure 3:
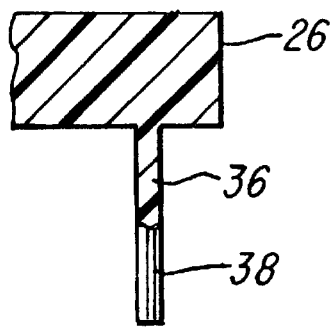
FIG. 3 is another view taken along line 3—3 in FIG. 2, showing a nozzle body in accordance with another embodiment of the invention showing electrically conductive materials insert-molded into the nozzle body.

Notice in FIGS. 3 and 4 that the terminals, such as terminals 36 and 38 or terminals 40 and 42, are integrally molded as part of nozzle body 28 in operative relationship with passageway 28a such that the conductive path for current flowing through nozzle body 28a is directed through the vicinity of the fluid flow path in order to optimize energy usage.

In the embodiment being described, the nozzle body 28 may be situated at a base area 16b of windshield 16 on the vehicle using suitable screws (not shown). Moreover, it is envisioned that the nozzle body 28 may be mounted directly to the vehicle such that the body 28 becomes grounded to the vehicle. This may reduce or eliminate the need for one of the terminals 36 or 38 or terminals 40 or 42. Alternatively, the nozzle body may be mounted in an insulated nozzle jacket (not shown) which is, in turn, mounted to the vehicle.

A method for maintaining a washer fluid at a predetermined temperature, such as above a freezing temperature for the washer fluid 15, will now be described.

The method begins by situating or mounting the nozzle body 28 onto the vehicle in proximity to the surface 16a of windshield 16 such that when an operator actuates the wiper switch or wash switch 24 in FIG. 1, controller 17 energizes the wiper drive 18 to become energized by an energy source, such as a battery or alternator (not shown). When energized, the wiper drive 18 drives the wiper blades 12 and 14 to wipe the surface 16a of windshield 16.

Substantially simultaneously with the energization of the wiper drive 18, the washer pump 20 also becomes energized to pump fluid from reservoir 22, through the tubing 29 to inlet 30 (FIG. 2), into passageway 28a and ultimately through outlet 34 such that the washer fluid may be directed to the surface 16a of windshield 16. In the embodiment being described, once the nozzle body 28 is electrically coupled to the energizing source, such as the battery or alternator (not shown), the electrically conductive thermo-plastic nozzle body 28 becomes heated to maintain the washer fluid in a liquid state. It has been found that by maintaining the nozzle body 28 at a predetermined temperature of about one hundred twenty degrees Fahrenheit at an ambient temperature of seventy-five degrees Fahrenheit, most washer fluids can be maintained in a non-frozen state even when the ambient temperature goes below thirty-two degrees (32°) Fahrenheit. Thus, the nozzle body 28, being thermally responsive to an electrical charge from energizing source 50, is advantageous to achieve the desired objectives of maintaining the washer fluid 15 in a liquid state.

Although not shown, the nozzle body 28 and terminals 36 and 38 may be coupled directly to energizing source via switch 24 and controller 17, such that the nozzle body 28 becomes energized when the washer pump 20 is energized. Alternatively, it is envisioned that the terminals 36 and 38 could be conductively coupled directly to the energization source 50 of the vehicle, such as the vehicles battery (not shown) or alternator (not shown), such that the nozzle body 28 is energized either at all times or when the vehicle's engine is running, respectively.

Advantageously, this system and method of the present invention provides a suitable method and apparatus for providing a one-piece, thermally and electrically conductive molded nozzle body 28. This has the advantages of being capable of using conventional molding techniques, such as conventional insert molding, injection molding or compression molding, which reduces or eliminates the need to separately mold or "build in" a separate heating device, such as a metal coil.

Although the embodiment being described illustrates the nozzle body 28 being a one-piece molded construction, it may also be advantageous to mold only a portion of the nozzle body 28, such as the area around passageway 28a, with the electrically-conductive thermoplastic material which would reduce or eliminate the need to mold the entire nozzle body 28 from the material.

Also, the nozzle body 28 and terminals 36 and 38 may be molded such that only the outlet 34 is integrally molded with the thermally and electrically conductive material.

While the methods and the forms of apparatus described herein constitute preferred embodiments of this invention, it is to be understood that the invention is not limited to these precise methods and forms of apparatus, and that changes may be made in either without departing from the scope of the invention, which is defined in the appended claims.

What is claimed is:

1. A windshield wiper nozzle comprising;
    a nozzle body comprising an opening through which a water fluid may pass; and
    said nozzle body being integrally formed of an electrically conductive thermo-plastic which becomes heated to a predetermined temperature when an electrical charge is applied thereto;
    a plurality of terminals for coupling said nozzle body to an electrical source;
    said plurality of terminals being integrally formed of said electrically conductive thermo-plastic in said nozzle body.

2. The windshield wiper nozzle as recited in claim 1 wherein said electrical charge is less than about 10 amperes.

3. The windshield wiper nozzle as recited in claim 1 wherein said nozzle body comprises an internal resistance of less than about 500 ohms.

4. The windshield wiper nozzle as recited in claim 1 wherein said nozzle body is molded from an electrically conductive thermo plastic comprising a volume resistivity defined by the equation:

$$P = R \times (A/T) = ohm = cm$$

where:

P = volume resistance;
A = Area (cm$^2$) of an electrode used to measure resistance R;
T = Thickness (cm) of nozzle body;
R = resistance (ohms); and wherein said resistance R is less than 500 ohms.

5. The windshield wiper nozzle as recited in claim 4 wherein said electrically conductive thermo-plastic comprises a volume resistance of less than $10^{11}$ ohms-cm.

6. The windshield wiper nozzle as recited in claim 1 wherein said nozzle body is integrally molded such that said nozzle body becomes grounded when it is mounted to a vehicle.

7. The windshield wiper nozzle as recited in claim 1 wherein said predetermined temperature is at least 120 degrees Fahrenheit at an ambient temperature of 75 degrees Fahrenheit.

\* \* \* \* \*

UNITED STATES PATENT AND TRADEMARK OFFICE
CERTIFICATE OF CORRECTION

PATENT NO.    : 5,979,796
DATED         : November 9, 1999
INVENTOR(S)   : Ponziani et al.

It is certified that error appears in the above-identified patent and that said Letters Patent is hereby corrected as shown below:

<u>Title page,</u>
Item [54], delete HEATED WINDSHIELD WIPER WASHER NOZZLE SYSTEM AND METHOD and insert -- HEATED WINDSHIELD WIPER NOZZLE SYSTEM -- therefor.
Item [56], "Topleszky" should be -- Toplenszky --.

<u>Column 4,</u>
Line 2, "+" should be -- ÷ --.

Signed and Sealed this

Fourth Day of September, 2001

*Attest:*

*Attesting Officer*

NICHOLAS P. GODICI
*Acting Director of the United States Patent and Trademark Office*